(12) United States Patent
Khojastepour et al.

(10) Patent No.: US 7,839,945 B2
(45) Date of Patent: Nov. 23, 2010

(54) STATIC AND DIFFERENTIAL PRECODING CODEBOOK FOR MIMO SYSTEMS

(75) Inventors: Mohammad Ali Khojastepour, North Brunswick, NJ (US); Xiaodong Wang, New York, NY (US); Mohammad Mahidian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 544 days.

(21) Appl. No.: 11/950,702

(22) Filed: Dec. 5, 2007

(65) Prior Publication Data

US 2008/0232501 A1    Sep. 25, 2008

Related U.S. Application Data

(60) Provisional application No. 60/895,904, filed on Mar. 20, 2007.

(51) Int. Cl.
*H04B 7/02* (2006.01)
*H04L 1/02* (2006.01)

(52) U.S. Cl. .................................. 375/267
(58) Field of Classification Search ............ 375/267
See application file for complete search history.

(56) References Cited

U.S. PATENT DOCUMENTS 7,154,416 B1 * 12/2006 Savage .................. 341/51

2005/0285764 A1 * 12/2005 Bessette et al. .......... 341/143
2007/0098106 A1    5/2007 Khojastepour et al.
2008/0080449 A1 *  4/2008 Huang et al. ............ 370/342
2008/0108310 A1 *  5/2008 Tong et al. .............. 455/69

OTHER PUBLICATIONS

Love et al, "What is the value of limited feedback for MIMO channels," Jun. 1, 2004.
Love et al, "Limited Feedback Unitary Precoding for Spatial Multiplexing Systems", IEEE Transactions on Information Theory, vol, 51, No. 8, Aug. 2005.
Love et al, "Multi-mode Precoding for MIMO Wireless Systems", IEEE Transactions on Information Theory, vol. 53, No. 10, Oct. 2005.
Li et al, "Capacity Criterion for Codebook Design in MIMO Systems with Limited Feedback", IEEE Int. Conf. Neural Networks, Aug. 8, 2008.

* cited by examiner

*Primary Examiner*—David C Payne
*Assistant Examiner*—Tanmay K Shah
(74) *Attorney, Agent, or Firm*—Bao Tran; Joseph Kolodka

(57) ABSTRACT

Systems and methods are disclosed to generate a codebook for channel state information by generating a random codebook; partitioning channel state information into a set of nearest neighbors for each codebook entry based on a distance metric; and updating the codebook by finding a centroid for each partition.

19 Claims, 3 Drawing Sheets

| a. Generate a random codebook (200) |
|---|
| b. Partition channel state information into a set of nearest neighbors for each codebook entry based on a distance metric (210) |
| c. Update the codebook by finding a centroid for each partition (220) |

FIG. 3

Input: $\text{SNR}_{ave}$, $\mu_l$, codebook size $2^B$, Iteration$_{max}$, rank $r$
Output: The codebook $Q = \{Q_1, Q_2, \ldots, Q_{2^B}\}$
Generate an evaluation set $\{H^{(l)}\}_{l=1}^{Size}$ based on the channel distribution.
Let $p = \frac{\text{SNR}_{ave}}{r} \max_k \{\|H^{(l)}\|_F^2\}$;
Initialize the codebook $Q(0) = \{Q_1(0), Q_2(0), \ldots, Q_{2^B}(0)\}$ randomly;
for $i = 1$ to Iteration$_{max}$ do
    Given $Q(i-1)$, find $\{V_k(i), k = 1, 2, \ldots, 2^B\}$ using (12);
    Calculate the centroid $\{Q_k(i), k = 1, 2, \ldots, 2^B\}$ using (16)-(19);
end
return $Q(\text{Iteration}_{max})$

FIG. 4

STATIC AND DIFFERENTIAL PRECODING CODEBOOK FOR MIMO SYSTEMS

The present application claims priority to U.S. Provisional Application Ser. No. 60/895,904, filed Mar. 20, 2007, the content of which is incorporated by reference.

The present invention relates to the codebooks used in wireless communications.

BACKGROUND

With an ever growing need for higher data communication rate over wireless medium, users are demanding high rate data transmission. One area in which the aforementioned considerations have arisen is in UMTS Terrestrial Radio Access Network (UTRAN) and Evolved-UTRA, which call for higher user data rates and improved quality of service. A number of proposals have discussed and concluded the need for multiple-antenna systems to achieve the target spectral efficiency, throughput, and reliability of EUTRA. These proposals have considered different modes of operation applicable to different scenarios. The basic assumptions that vary among proposals include (i) using single stream versus multiple streams, (ii) scheduling one user at a time versus multiple users, (iii) having multiple streams per user versus a single stream per user, and (iv) coding across multiple streams versus using independent streams. A common factor among various downlink physical layer multiple-input-multiple-output (MIMO) proposals, however, is a feedback strategy to control the transmission rate and possibly vary the transmission strategy.

MIMO antenna systems can be effective in fading environment by providing significant performance improvements and achievable data rates in comparison to single antenna systems. Closed loop MIMO systems typically transmit channel state information from a receiver to a transmitter. Transmitting the channel state information consumes bandwidth that might otherwise be available for data traffic. The performance gain achieved by multiple antenna system increases when the knowledge of the channel state information (CSI) at each end, either the receiver or transmitter, is increased. Although perfect CSI is desirable, practical systems are usually built only on estimating the CSI at the receiver, and possibly feeding back the CSI to the transmitter through a feedback link with a very limited capacity. Using CSI at the transmitter, the transmission strategy is adapted over space (multiple antennas) and over time (over multiple blocks).

Conventional DL MIMO transmission strategy includes quantized precoding schemes, antenna selection, antenna cycling (with or without rank control), and different space-time coding and spatial multiplexing transmission scheme. The quantized precoding schemes are used whenever a feedback link from the receiver to the transmitter is present. The performance of quantized precoding scheme depends on the codebook design and the complexity and memory requirement are further functions of the precoding algorithm. Hence, codebook design is one of the main aspects of the quantized precoding schemes. The conventional design criterion is based on SNR maximization which is not necessarily the capacity-optimal design strategy. Moreover, the precoder size is assumed to be fixed which means the number of transmitted data streams, i.e., precoding rank, is fixed and is usually taken to be the minimum of the number of transmit and receive antennas.

SUMMARY

In one aspect, a static codebook design provides a successive codebook structure and the precoding matrices are obtained from a set of precoding vector codebooks. This design addresses the problem of optimized vector codebook design, i.e., the set of vector codebooks which result in the optimal precoding matrix codebook.

In another aspect, a different code-book design problem. When the channel is correlated in time (or in frequency, e.g., across different tones in OFDM systems), the correlation can be used to considerably reduce the feedback requirement without loss in performance. The idea of differential codebook is to feedback only the variation in the channel, since typically quantizing the channel variations requires a smaller codebook than quantizing the channel itself.

Advantages of preferred embodiments of the above aspects may include one or more of the following. The design jointly optimizes the vector codebooks such that the resulting precoder matrices are optimized. By employing the differential codebook and optimized vector codebook, the performance of quantized precoding schemes is improved and higher throughput will be achievable. In comparison to the other competitive schemes on codebook based precoding which use the CQI-metric based precoder selection, the codebook requires less memory to store and has lower computational complexity. The optimal codebook is channel specific and is finely tuned to the channel statistics. The vector codebooks can be used with successive or Householder structured codebook. Simulation results show the superiority of the designed codebooks over the conventional codebooks.

BRIEF DESCRIPTION OF THE DRAWINGS

FIG. 3 shows an exemplary codebook generation process.

FIG. 4 shows an exemplary precoder codebook design algorithm.

DESCRIPTION

Figure 1:
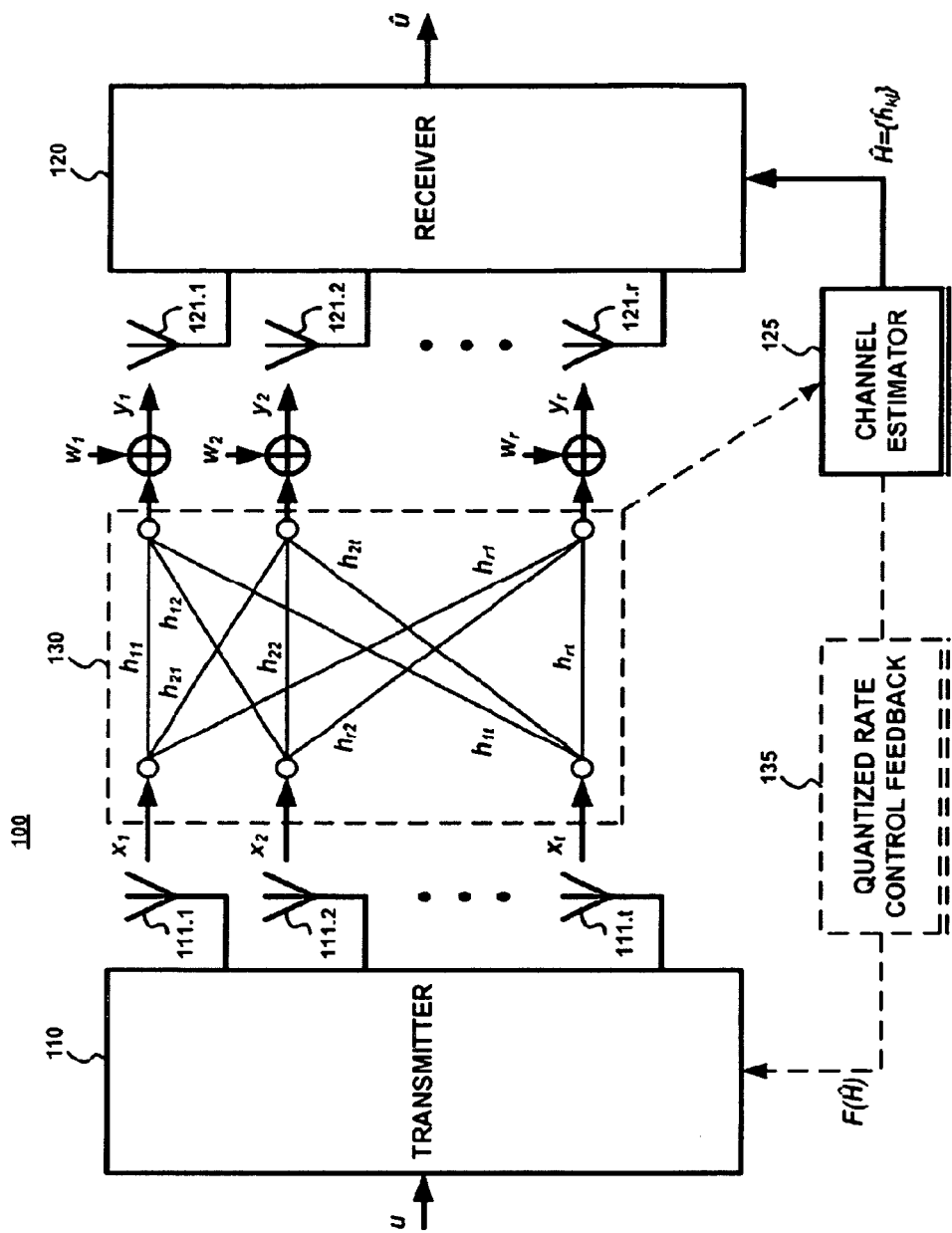
FIG. 1 is a schematic block diagram of a multiple-antenna communications system with quantized feedback of channel state information.
Figure 2:
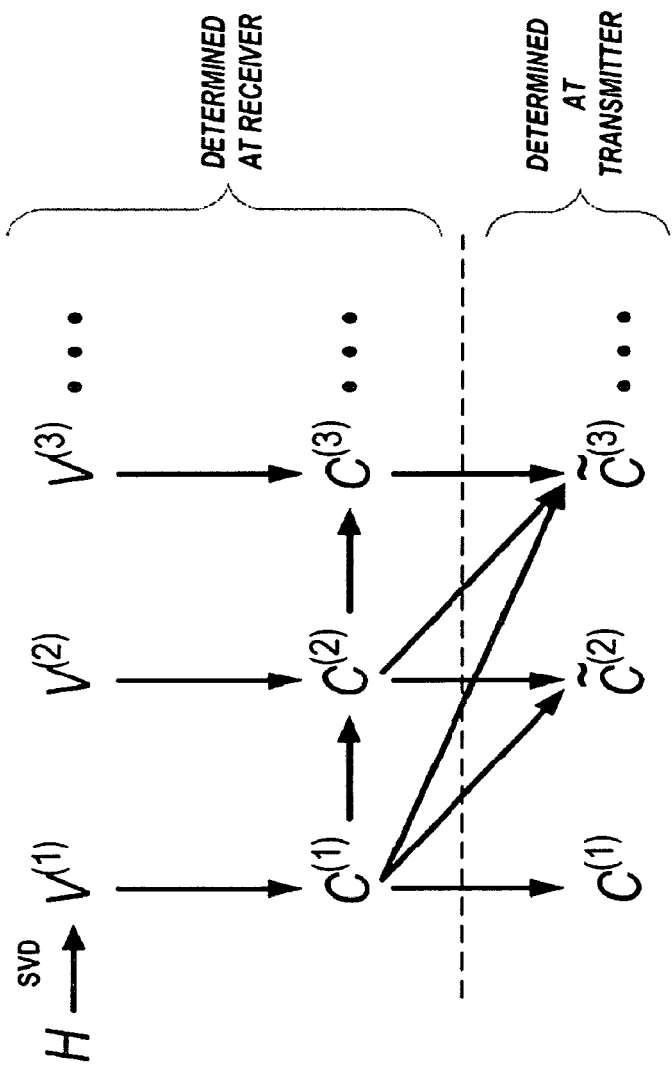
FIG. 2 schematically illustrates the dependency of variables in the determination of eigenvectors and quantized eigenvectors and the re-creation of quantized eigenvectors in a successive beamforming scheme.

An exemplary multiple-antenna communication system 100 with static and differential precoding codebook is schematically shown in FIGS. 1-2. A transmitter 110 transmits from t transmitting antennas 111.1-111.$t$ over a fading channel 130 to r receiving antennas 121.1-121.$r$ coupled to a receiver 120. A channel estimator 125 provides an estimate of the channel 130 to the receiver 120. The channel estimate is also quantized and provided to the transmitter 110 via a quantized rate control feedback channel 135.

For a multiple-antenna system with r receive and t transmit antennas the baseband channel model can be expressed as follows: $Y=HX+W$, (1) where Y is the r×1 received column vector, H is the r×t channel matrix, X is the t×1 transmit column vector, and W is the r×1 noise column vector. The input is subject to an average power constraint P, i.e, $tr(Q) \leq P$, where $Q=E[XX^H]$, $E[.]$ denotes the expected value and tr(.) represents the trace of a matrix.

In an exemplary multi-rank beamforming scheme in accordance with the present invention, channel state information (CSI) is available to the transmitter (CSIT) as well as the receiver (CSIR). Where perfect CSIT and CSIR are assumed, the capacity of the multiple-antenna fading channel 130 can be achieved through power adaptation over time (one average power for each channel state) and water-filling power control over multiple eigenvectors of the channel for each block of transmission.

In systems that employ beamforming such as the MIMO systems, the beamforming matrix (referred to herein as a codeword) generated in response to perceived channel conditions is computed and quantized at the receiver first, and then is provided to the source transmitter (e.g., via feedback). A conventional approach to reduce the overhead associated with this feedback is to provide matrix codebook(s) at each of the transmitter and the receiver, each of the codebook(s) comprising a plurality, or set, of potential beamforming matrixes that may be used depending on the channel conditions perceived at the receiver. When the receiver has identified the appropriate matrix codebook(s), the receiver will typically feed back only an index (instead of the actual matrix entries) that points to the appropriate codeword in the codebook(s) stored at the transmitter.

Turning now to FIG. 3, an exemplary process to generate the codebook is shown. In this process, a random codebook is generated (200). Next, the process partitions channel state information into a set of nearest neighbors for each codebook entry based on a distance metric (210). The process then updates the codebook by finding a centroid for each partition (220).

In the MIMO system of FIG. 1 with t transmit antennas at the base station and a user each with r receive antennas, the complex baseband signal model is given by $$y = Hx + w, \quad (1)$$

where x is the t×1 transmitted signal vector, H is the r×t channel matrix, $w:N_c(0,I)$ is a circularly symmetric complex additive white Gaussian noise vector, and y is the r×1 received signal vector. A block fading channel model is used in which the channel remains constant during the transmission of each packet (or codeword of length T) and it changes independently from one block to another, where the distribution of the channel state is known a priori. The average power constraint is given by $E[x^H x] \leq P$.

In maximizing the throughput in single user (SU-) MIMO systems (or sum-rate throughput for multiple user (MU-) MIMO systems) which is usually the primary goal in downlink transmissions, the following assumptions can be used: (1) the user feeds back the quantized channel state via a limited feedback link; (2) based on the feedback information, the base station performs a linear precoding (and only linear precoding is allowed) of the transmitted streams.

Let UDV* be the singular value decomposition (SVD) of the channel matrix H. With B bits of feedback, the user quantizes the first n column of V (where n≤min(r, t)) is a fixed number predetermined by the base station) using a quantization codebook $Q=\{Q_1, Q_2, \ldots, Q_{2^B}\}$, $Q_i \in \mathbb{C}^{t \times r}$, as follows $$V(1:n) = \underset{Q \in Q}{\operatorname{argmin}} \, d(V(1:n), Q) \quad (2)$$

where $d(\cdot, \cdot)$ is some distance metric. The codebook design problem and the appropriate choice of the distance metric have been considered in prior art. The columns of the quantized precoding matrix V(1:n) correspond to possible different streams for this user.

The transmitted signal x from the base station then consists of L data streams, $u_1, u_2, \ldots, u_L$, sent through column vectors $g_1, g_2, \ldots, g_L$ of a linear precoder G. We have $$x = Gu = \sum_{i=1}^{L} u_i g_i. \quad (3)$$

In SU-MIMO systems, we have L=n while in MU-MIMO systems we have L≥n where one or more than one streams may be intended for each user.

Next, a codebook design will be discussed which is static and predesigned and does not adopt to the changes in the average channel condition. The first design considers rank specific codebook design where for each transmission rank a separate codebook is designed. The second design is based on transformation which generates the codebooks for all ranks based on a set of vector codebook.

Design Criterion

For a given transmission rank n and B bits of PMI feedback, the codebook design problem is formulated as finding the set $Q=\{Q_1, Q_2, \ldots, Q_{2^B}\}$ of (t×n) semi-unitary matrices that is a solution to the optimization problem given by $$C = \max_Q E\left[\max_{Q \in Q} \log \det\left(I + \frac{P}{t} H Q Q^* H^*\right)\right]. \quad (4)$$

Let UDV* be the partial SVD of H obtained by retaining only the n right singular vectors that correspond to the n largest singular values of H. For a given H the optimal (t×n) precoder that maximizes the instantaneous mutual information is V, thus, for large enough codebook size:

$$C \approx \max_Q E\left[\max_{Q \in Q} \log \det\left(I + \frac{P}{t}(D^*D) V^* Q Q^* V\right)\right]. \quad (5)$$

The approximation in (5) is based on the observation that a well designed large enough codebook can closely sample the set of all possible V.

Next, an approximate upper bound on C is determined by considering channel realizations whose norms are bounded, i.e., H such that $\|H\|_F^2 = \operatorname{tr}[H^*H] = \operatorname{tr}[D^*D] \leq \beta$. For such channels:

$$C < \approx \max_Q E\left[\max_{Q \in Q} \log \det\left(I + \frac{P}{t} \beta V^* Q Q^* V\right)\right]. \quad (6)$$

Considering the low SNR approximation of the bound in (6), i.e., letting P→0, $$C < \approx \max_Q E\left[\max_{Q \in Q} \frac{P\beta}{t} \|V^* Q\|_F^2\right]. \quad (7)$$

The inner maximization in the bound in (7) is equivalent to minimizing the chordal distance between the dominant right eigenvectors of the channel and the corresponding quantized vectors, where the chordal distance is defined as $$d_{chordal}(Q,V) = \frac{1}{\sqrt{2}}\|VV^* - QQ^*\|_F = \sqrt{t - \|V^*Q\|_F^2}. \quad (8)$$

On the other hand, considering the high SNR approximation of (6), i.e., $P \to \infty$:

$$C < \approx \max_Q E\left[\max_{Q \in Q}\log\left(\left(\frac{P\beta}{t}\right)^n \det(V^*Q)^2\right)\right]. \quad (9)$$

The inner maximization in the bound in (9) is equivalent to minimizing the Fubini-Study (FS) distance between the dominant right eigenvectors of the channel and the corresponding quantized vectors, where the FS distance is defined as $$d_{FS}(Q,V) = \arccos(\det(V^*Q)). \quad (10)$$

This is so because log(.) is a monotonically increasing function and arccos(.) is a monotonically decreasing function.

For finite SNRs, since the transmitted signals are the linear combination of the columns of the precoder Q, the precoding codebook design used here relies on a metric that measures the distance between the subspaces spanned by different precoders. While there is no known distance metric directly associated with the capacity expression (5), the inner maximization in the bound in (6) is equivalent to minimizing the following p-metric with $$p = \frac{\beta P}{t}$$

$$d_p(Q,V) = \arccos\left[\frac{\det(I + pV^*QQ^*V)}{(1+p)^r}\right] \quad (11)$$

between the subspaces defined by V and Q on the Grassmanian manifold $G(N_T, r)$ which in turn is the space of all r dimensional subspaces of an $N_T$ dimensional vector space. The design based on the p-metric depends on the SNR level. The choice of $\beta$ is discussed next. p-metric is in fact a valid distance metric in the Grassmanian manifold. Moreover, it can be readily verified that if $p \to 0$, the p-metric is equivalent to the chordal distance; and if $p \to \infty$, the p-metric is equivalent to the Fubini-Study distance. Therefore, the codebook design based on the p-metric bridges the gap between the design for low SNR and that for high SNR.

Rank Specific Codebook Design

In this section, the design of an independent codebook for each rank r is discussed. The design algorithm is based on the generalized Lloyd-Max algorithm that is a widely used for solving a variety of vector quantization problems. Given the quantization codebook $Q = \{Q_1, Q_2, \ldots, Q_{2^B}\}$, the optimal partitioning satisfies $$V_k = \{V \in C^{t \times n} : d_p(V, Q_k) \leq d_p(V, Q_j), \forall j \neq k\}. \quad (12)$$

To satisfy the centroid condition, the following problem is solved for the $k^{th}$ partition $$Q_k = \operatorname{argmin} J(Q) = \arg\min_{Q \in C^{t \times n}, Q^*Q = I} E[d_p(Q, V) | V \in V_k]. \quad (13)$$

Since an analytical solution for the above optimal centroid problem does not exist, this is solved numerically. To employ the gradient-descent search algorithm, the real representation of the matrix Q denoted by $\overline{Q}$ is defined as $$\overline{Q} = \begin{bmatrix} \Re e(Q) & -\Im m(Q) \\ \Im m(Q) & \Re e(Q) \end{bmatrix} \quad (14)$$

The real representation $\overline{H}$, $\overline{V}$ of the matrices H, V, respectively, are similarly defined. Also, the system can parameterize the semi-unitary matrix $Q \in C^{t \times n}$ by using $N_\Phi = 2(t-n+1)n$ independent real parameters $\phi_i$, $i = 1, \ldots, N_\Phi$. Therefore, an unconstrained problem can be obtained in terms of the vector $\Phi = [\phi_1, \phi_2, \ldots, \phi_{N_\Phi}]$:

$$\min_{Q \in C^{t \times n}, Q^*Q = I} J(Q) = \min_\Phi J(Q(\Phi)) \quad (15)$$
$$= \min_\Phi E[d_p(\overline{Q}(\Phi), \overline{V}) | V \in V_k].$$

The derivative of the objective function (15) with respect to $\phi_k$ is given by $$\frac{\partial}{\partial \phi_k} J(\overline{Q}(\Phi)) = tr\left\{\left[\frac{\partial \overline{Q}(\Phi)}{\partial \phi_k}\right]^T \nabla_{\overline{Q}} J(\overline{Q})\right\}, 1 \leq k \leq N_\Phi \quad (16)$$

where $$\nabla_{\overline{Q}} J(\overline{Q}) = E\left[\begin{array}{c} -\frac{(1-F^2)^{-1/2}}{(1+p)^r} \\ \nabla_{\overline{Q}} \det(I + p\overline{V}^T\overline{QQ}^T\overline{V}) \end{array} \middle| V \in V_k\right] \quad (17)(18)$$

$$= E\left[\begin{array}{c} -2pF(1-F^2)^{-1/2}\overline{V}\overline{V}^T \\ \overline{Q}(I + p\overline{V}^T\overline{QQ}^T\overline{V})^{-1} \end{array} \middle| V \in V_k\right],$$

with $$F = \frac{\det(I + p\overline{V}^T\overline{QQ}^T\overline{V})}{(1+p)^r}.$$

The expression $$\frac{\partial \overline{Q}(\Phi)}{\partial \phi_k}$$

can be found using standard techniques. The gradient-descent search algorithm can be used with the following update formula $$\Phi^{(l+1)} = \Phi^{(l)} - \mu_l \nabla_{N_\Phi} J(\overline{Q}(\Phi))|_{\Phi^{(l)}} \quad (19)$$

where $\mu_l$ is the sequence of the step sizes. Upon convergence, $\Phi$ is used to find the corresponding unitary matrix $Q(\Phi)$.

In sum, as shown in FIG. 4, the precoder codebook design algorithm is as follows:

---

Input: $SNR_{ave}$, $\mu_l$, codebook size $2^B$, Iteration$_{max}$, rank r
Output: The codebook $Q = \{Q_1, Q_2, ..., Q_{2^B}\}$
Generate an evaluation set $\{H^{(l)}\}_{l=1}^{Size}$ based on the channel distribution.
Let
$$p = \frac{SNR_{ave}}{r} \max_k \{\|H^{(1)}\|_p^2\};$$
Initialize the codebook $Q(0) = \{Q_1(0), Q_2(0), ..., Q_{2^B}(0)\}$ randomly;
for i = 1 to Iteration$_{max}$ do
    Given Q(i − 1), find $\{V_k(i), k = 1, 2, ..., 2^B\}$ using (12);
    Calculate the centroid $\{Q_k(i), k = 1, 2, ..., 2^B\}$ using (16)-(19);
end
return Q(Iteration$_{max}$)

---

Nested Vector Codebook Design

In this embodiment, the system imposes a structure on the codebook which facilitates implementation of the precoding scheme in a practical system by reducing the computational complexity as well as the memory requirement. Denote $$e_k = [1; \underbrace{0; \ldots; 0}_{k-1}]$$

Note that by applying a series of successive rotations, any semi-unitary matrix $Q \in C^{t \times n}$ can be expressed as $$Q = \left[ q^{(1)}, (\Upsilon_1(q^{(1)}))^* \left[ \begin{array}{c} 0 \\ q^{(2)}, (\Upsilon_2(q^{(2)}))^* \left[ \begin{array}{c} 0 \\ q^{(3)}, \ldots \end{array} \right] \end{array} \right] \right] \quad (20)$$

where $\Upsilon_k : C^{t-k+1} \to C^{(t-k+1) \times (t-k+1)}$ is a mapping that for any unit-norm vector $q^{(k)} \in C^{t-k+1}$ returns a rotation matrix $\Upsilon_k(q^{(k)})$ such that $\Upsilon_k(q^{(k)}) q^{(k)} = e_{t-k+1}$. Therefore, instead of designing the codebook of precoding matrices Q, the vector codebooks contains all the vectors $q^{(k)}$.

Consider $N_T - 1$ sets of unit-norm vectors in $Q^{(1)} = \{q_i^{(1)}\}_{i=1}^{K_1} \subset C^t$, $Q^{(2)} = \{q_i^{(2)}\}_{i=1}^{K_2} \subset C^{t-1}$, ..., $Q^{(t-1)} = \{q_i^{(t-1)}\}_{i=1}^{K_{t-1}} \subset C^2$. If $Q^{(t)} = 1$, for rotations, the Householder transformation defined by $$\Psi(x) = I - \frac{2xx^*}{\|x\|^2}$$

can be used and let $$\Upsilon_k(q^{(k)}) = \Psi(q^{(k)} - e_{t-k+1}) \quad (21)$$
$$= 1 - \frac{2(q^{(k)} - e_{t-k+1})(q^{(k)} - e_{t-k+1})^*}{\|q^{(k)} - e_{t-k+1}\|^2}$$

To have a valid Householder transformation in the complex domain, the first element of the vector x has to be real valued. The codebook of rank r consists of the set of $\prod_{i=1}^{r} K_i$ precoding matrices of size $t \times n$ generated using the vector codebooks defined above. The size of the vector sets, i.e., $K_1, K_2, \ldots, K_{t-1}$, are the design parameters and are usually chosen such that $K_1 \geq K_2 \geq \ldots \geq K_{t-1}$. For example, to design a set of 12 precoders of rank 2, $K_1 = 4$ and $K_2 = 3$. By choosing the indices $i_1, i_2, \ldots, i_r$, $i_j \in \{1, 2, \ldots, K_j\}$ of the vectors from $Q^{(1)}$, $Q^{(2)}, \ldots, Q^{(r)}$, any precoder of rank r, $r = 1, 2, \ldots, t-1$, is generated as $$Q(q_{i_1}^{(1)}, q_{i_2}^{(2)}, \ldots, q_{i_r}^{(r)}) = \left[ q_{i_1}^{(1)}, \Psi(q_{i_1}^{(1)} - e_t) \left[ \begin{array}{c} 0 \\ q_{i_2}^{(2)} \end{array} \right], \ldots, \right. \quad (22)$$

$$\left. \Psi(q_{i_1}^{(1)} - e_t) \left[ \begin{array}{c} 0 \\ \Psi(q_{i_2}^{(2)} - e_{t-1}) \ldots \left[ \begin{array}{c} 0 \\ q_{i_r}^{(r)} \end{array} \right] \ldots \end{array} \right] \right].$$

The optimization is performed over the vector codebooks $Q^{(1)}, Q^{(2)}, \ldots, Q^{(t-1)}$. The partitioning and centroid steps for the first vector codebook are given by Partitioning: Given the quantization codebook $Q^{(1)} = \{q_1^{(1)}, q_2^{(1)}, \ldots, q_{K_1}^{(1)}\}$, the optimal partitioning satisfies $$V_k^{(1)} = \{v \in C^{t \times 1} : d_p(v, q_k^{(1)}) \leq d_p(v, q_j^{(1)}), \forall j \neq k\} \quad (23)$$

Centroid: The centroid for the $k^{th}$ partition is given by $$q_k^{(1)} = \arg \min_{q \in C^{t \times 1}, q^* q = 1} E[d_p(q, v) \mid v \in V_k^{(1)}]. \quad (24)$$

where the expectation is taken over the dominant singular vector v.

For the second codebook, a set of doubly indexed partitions can be used, where each partition is identified by two vectors in the first and the second vector codebooks $Q^{(1)}$ and $Q^{(2)}$. The partitioning and centroid steps are then as follows.

Partitioning: Given the quantization codebooks $Q^{(1)} = \{q_1^{(1)}, q_2^{(1)}, \ldots, q_{K_1}^{(1)}\}$ and $Q^{(2)} = \{q_1^{(2)}, q_2^{(2)}, \ldots, q_{K_2}^{(2)}\}$, the optimal partitioning satisfies $$v_{i_1, i_2}^{(2)} = \left[ V^{(2)} = [v^{(1)} v^{(2)}] \in C^{t \times 2} : \right. \quad (25)$$

$$d_p \left( V^{(2)}, \left[ q_{i_1}^{(1)}, \Psi(q_{i_1}^{(1)} - e_t) \left[ \begin{array}{c} 0 \\ q_{i_2}^{(2)} \end{array} \right] \right] \right) \leq d_p \left( V^{(2)}, \left[ q_{j_1}^{(1)}, \right. \right.$$

-continued $$\Psi(q_{j_1}^{(1)} - e_t) \begin{bmatrix} 0 \\ q_{j_2}^{(2)} \end{bmatrix}\right]\right), \forall (j_1, j_2) \neq (i_1, i_2) \right\}.$$

Centroid: The centroid corresponding to index $i_2$ is given by $$q_{i_2}^{(2)} = \arg \min_{q \in \mathbb{C}^{(t-1) \times 1}: q^*q=1} \sum_{i_1=1}^{K_1} \mathbb{E}\left(d_p\left(\left[q_{i_1}^{(1)}, \Psi(q_{i_1}^{(1)} - e_t) \begin{bmatrix} 0 \\ q \end{bmatrix}\right], V^{(2)}\right) \mathcal{I}(V^{(2)} \in v_{i_1,i_2}^{(2)})\right].$$ (26)

where the expectation is over the first two dominant eigenvectors, i.e., $V^{(2)}$ and $\mathcal{I}(.)$ denotes the indicator function.

In general, in finding the partitioning for the $r^{th}$ vector codebook $Q^{(r)}$, a set of r-tuple indexed partitions is defined and the partitioning and centroid conditions follows the same structure as above. A design procedure similar to Algorithm of FIG. 3 can be used to find the vector codebooks.

Differential Codebook Design

When the channel is correlated in time (or in frequency, e.g., across different tones in OFDM systems), the correlation can be used to considerably reduce the feedback requirement without loss in performance. The idea of differential codebook is to feedback only the variation in the channel, since typically quantizing the channel variations requires a smaller codebook than quantizing the channel itself.

Let V(s) denote the quantized version of the first N right eigenvectors of the channel matrix $H(s)=U(s)D(s)V^*(s)$ at time s using the static quantized codebook design previously discussed. For time s+1, we then find V(s+1)=OV(s+1) by using a t×t unitary transformation matrix O. With B bits of feedback, the differential codebook design is formulated as finding the set of $O=\{O_1, O_2, \ldots, O_{2^B}\}$ unitary matrices such that the average quantization error defined by $$\epsilon = E[\|O(V(s), V(s+1))V(s) - V(s+1)\|_F^2]$$ (27)

is minimized where O(V(s),V(s+1)) denotes the transformation as a function of the right eigenvectors of the channel for two consecutive time slots.

In order to employ the Lloyed-Max algorithm, the system finds the optimal partitioning and the centroid for each partition. The optimal partitioning for the quantizer O(V(s),V(s+1)) satisfies $$V_k = \{(\hat{V}, V) \in \mathbb{C}^{t \times r} \times \mathbb{C}^{t \times r}: \|O_k \hat{V} - V\|_F^2 \leq \|O_j \hat{V} - V\|_F^2 \forall j \neq k\},$$ (28)

where $\hat{V}$ and V denote the quantized and the actual right eigenvectors of the channel for two consecutive time slots, respectively. To satisfy the centroid condition, the following problem for the $k^{th}$ partition is solved:

$$\arg \min_{O \in \mathbb{C}^{M \times M}, O^*O=I} E[\|O\hat{V} - V\|_F^2 | (\hat{V}, V) \in V_k].$$ (29)

Since $\|O\hat{V} - V\|_F^2 = V\|_F^2 - 2\Re tr\{V\hat{V}^*O^*\} + \|\hat{V}\|_F^2$, the following is maximized $$E[\Re tr\{V\hat{V}^*O^*\} | (\hat{V}, V) \in V_k] = \Re tr\{E[V\hat{V}^* | (\hat{V}, V) \in V_k]O^*\} =$$

$$\Re tr\{\Theta \sum \Phi^* O^*\} = \Re tr\{\sum \Phi^* O^* \Theta\} = \Re \sum_{i=1}^{M} \sigma_i s_{ii}$$ (30)

where $\Theta \Sigma \Phi^* = \text{SVD}(E[V\hat{V}^* | (\hat{V}, V) \in V_k])$ and $T=[s_{ij}] = \Phi^*O^*\Theta$ is a unitary matrix. Thus, (30) is maximized when all $s_{ii}=1$, i.e., when $O=\Theta\Phi^*$. It should be noted that since the final solution depends only on $\Theta\Phi^*$, it can be obtained directly through the polar decomposition of $E[V\hat{V}^*|(\hat{V},V) \in V_k]$ instead of the SVD.

The idea behind differential quantization is to use $B_1$ bits for the main quantizer and $B_2 < B_1$ bits for the differential quantizer. For example, in OFDM systems, when the precoder is used for a chunk of adjacent OFDM tones, the precoding is usually much more effective if the chunk size is smaller. Hence, if B bits are available for precoding across a large chunk of adjacent OFDM tones, the chunk is usually broken into several smaller, e.g., 3 sub-chunks of the same sizes where the precoder for each sub-chunk is specified with B/3 bits. However, considering the correlation between the adjacent sub-chunks, we can use a main quantizer with $B_1 > B/3$ bits for quantizing the center sub-chunk and use a differential codebook with $B_2 < B/3$ bits for quantizing each of the other two sub-chunks, where $B=B_1+2B_2$, and $B_2 < B_1$. Depending on the correlation structure we can usually pick $B_2 < B_1$ such that the precoding performance of all three sub-chunks is almost similar.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to generate a codebook for channel state information in a wireless system having multiple input/multiple output (MIMO) antennas, comprising:
   a. generating a random codebook;
   b. partitioning channel state information into a set of nearest neighbors for each codebook entry based on a distance metric; and c. updating the codebook by finding a centroid for each partition
wherein the centroid for the $k^{th}$ partition comprises $$q_{i_2}^{(2)} = \arg \min_{q \in \mathbb{C}^{(t-1) \times 1}, q^*q=1} \sum_{i_1=1}^{K_1} \mathbb{E}\left[d_p\left(\left[q_{i_1}^{(1)}, \Psi(q_{i_1}^{(1)} - e_t)\begin{bmatrix}0\\q\end{bmatrix}\right], V^{(2)}\right) \mathcal{I}(V^{(2)} \in v_{i_1,i_2}^{(2)})\right].$$

2. The method of claim 1, comprising optimizing the codebook.

3. The method of claim 1, wherein the codebook Q comprises $\{Q_1, Q_2, \ldots, Q_{2^B}\}$, comprising determining an optimal partitioning satisfying $V_k = \{V \in \mathbb{C}^{t \times r} : d_p(V, Q_k) \leq d_p(V, Q_j), \forall j \neq k\}.$ 4. The method of claim 1, comprising determining the centroid by solving for the $k^{th}$ partition $$Q_k = \arg\min J(Q) = \arg\min_{Q \in \mathbb{C}^{t \times r}, Q^*Q=I} E[d_p(Q, V) | V \in V_k].$$

5. The method of claim 1, comprising determining an optimal partitioning satisfying $V_k^{(1)} = \{v \in \mathbb{C}^{t \times 1} : d_p(v, q_k^{(1)}) \leq d_p(v, q_j^{(1)}), \forall j \neq k\}.$ 6. The method of claim 1, comprising determining the centroid for the $k^{th}$ partition by $$q_k^{(1)} = \arg\min_{q \in \mathbb{C}^{t \times 1}, q^*q=1} E[d_p(q, v) | v \in V_k^{(1)}].$$

7. The method of claim 1, comprising generating a set of doubly indexed partitions.

8. The method of claim 7, wherein each partition is identified by two vectors in the first and the second vector codebooks $Q^{(1)}$ and $Q^{(2)}$.

9. A method to generate a codebook for channel state information in a wireless system having multiple input/multiple output (MIMO) antennas, comprising:
 a. generating a random codebook;
 b. partitioning channel state information into a set of nearest neighbors for each codebook entry based on a distance metric;
 c. updating the codebook by finding a centroid for each partition; and
 d. determining an optimal partitioning satisfying $$v_{i_1,i_2}^{(2)} = \left[V^{(2)} = [v^{(1)} v^{(2)}] \in \mathbb{C}^{t \times 2} : \right.$$

$$d_p\left(V^{(2)}, \left[q_{i_1}^{(1)}, \Psi(q_{i_1}^{(1)} - e_t)\begin{bmatrix}0\\q_{i_2}^{(2)}\end{bmatrix}\right]\right) \leq d_p\left(V^{(2)}, \left[q_{j_1}^{(1)}, \right.\right.$$

$$\left.\left.\Psi(q_{j_1}^{(1)} - e_t)\begin{bmatrix}0\\q_{j_2}^{(2)}\end{bmatrix}\right]\right), \forall (j_1, j_2) \neq (i_1, i_2)\right\}.$$

10. The method of claim 1, wherein the codebook design is static.

11. The method of claim 3, wherein the codebook is a rank specific codebook.

12. The method of claim 1, wherein the codebook is a nested vector codebook.

13. The method of claim 1, wherein the codebook comprises a differential codebook.

14. The method of claim 13, wherein the differential codebook provides feedbacks only on variations in the channel.

15. The method of claim 1, comprising applying Lloyd-Max technique.

16. A method to generate a codebook for channel state information in a wireless system having multiple input/multiple output (MIMO) antennas, comprising:
 a. generating a random codebook;
 b. partitioning channel state information into a set of nearest neighbors for each codebook entry based on a distance metric;
 c. updating the codebook by finding a centroid for each partition; and
 d. determining an optimal partitioning by satisfying:

$V_k = \{(\hat{V}, V) \in \mathbb{C}^{t \times r} \times \mathbb{C}^{t \times r} : \|O_k \hat{V} - V\|_F^2 \leq \|O_j \hat{V} - V\|_F^2 \forall j \neq k\}.$ 17. A method to generate a codebook for channel state information in a wireless system having multiple input/multiple output (MIMO) antennas, comprising:
 a. generating a random codebook;
 b. partitioning channel state information into a set of nearest neighbors for each codebook entry based on a distance metric;
 c. updating the codebook by finding a centroid for each partition; and
 d. maximizing:

$$E[\Re tr\{V\hat{V}^*O^*\} | (\hat{V}, V) \in V_k] = \Re tr\{E[V\hat{V}|(\hat{V}, V) \in V_k]O^*\} =$$

$$\Re tr\{\Theta \sum \Phi^* O^*\} = \Re tr\{\sum \Phi^* O^* \Theta\} = \Re \sum_{i=1}^{M} \sigma_i s_{ii}$$

where $\Theta \Sigma \Phi^* = \text{SVD}(E[V\hat{V}^* | (\hat{V}, V) \in V_k])$ and $T = [s_{ij}] = \Phi^* O^* \Theta$ is a unitary matrix.

18. A wireless system, comprising
 a. one or more transmitters;
 b. one or more receivers each having multiple input/multiple output (MIMO) antennas adapted to receive data from the one or more transmitters, and
 c. a codebook formed by generating a random codebook; partitioning channel state information into a set of nearest neighbors for each codebook entry based on a distance metric; and updating the codebook by finding a centroid for each partition
wherein the centroid for the $k^{th}$ partition comprises $$q_{i_2}^{(2)} = \arg \min_{q \in \mathbb{C}^{(t-1) \times 1}, q^*q=1} \sum_{i_1=1}^{K_1} \mathbb{E}\left[d_p\left(\left[q_{i_1}^{(1)}, \Psi(q_{i_1}^{(1)} - e_t)\begin{bmatrix}0\\q\end{bmatrix}\right], V^{(2)}\right) \mathcal{I}(V^{(2)} \in v_{i_1,i_2}^{(2)})\right].$$

19. The system of claim 18, wherein the codebook is generated using a Lloyd-Max technique.

* * * * *